(12) United States Patent
Herrmann

(10) Patent No.: US 7,716,678 B2
(45) Date of Patent: May 11, 2010

(54) PROCESSING MESSAGES IN A MESSAGE QUEUEING SYSTEM

(75) Inventor: Christian Herrmann, Rangendingen (DE)

(73) Assignee: International Business Machines Corporation, Armonk, NY (US)

( * ) Notice: Subject to any disclaimer, the term of this patent is extended or adjusted under 35 U.S.C. 154(b) by 1181 days.

(21) Appl. No.: 11/290,080

(22) Filed: Nov. 30, 2005

(65) Prior Publication Data

US 2006/0150196 A1  Jul. 6, 2006

(30) Foreign Application Priority Data

Dec. 30, 2004  (EP)  ..................... 04107060

(51) Int. Cl.
*G06F 3/00* (2006.01)
(52) U.S. Cl. ........................... 719/313; 719/314
(58) Field of Classification Search .......... 719/313–314
See application file for complete search history.

(56) References Cited

U.S. PATENT DOCUMENTS

| | | | | |
|---|---|---|---|---|
| 4,914,583 | A * | 4/1990 | Weisshaar et al. | 719/313 |
| 7,047,532 | B1 * | 5/2006 | Connelly | 719/310 |
| 7,127,507 | B1 * | 10/2006 | Clark et al. | 709/224 |
| 2005/0155040 | A1 * | 7/2005 | Doshi et al. | 719/313 |
| 2008/0256553 | A1 * | 10/2008 | Cullen | 719/313 |

* cited by examiner

*Primary Examiner*—Li B Zhen
*Assistant Examiner*—Shih-Wei Kraft
(74) *Attorney, Agent, or Firm*—Jordan Law LLC

(57) ABSTRACT

A system, method, and a computer program product for processing messages in a message queuing system includes an application repository, a message store, and a queue-less application programming interface in each message queuing system. The application repositories may store application identification data provided by applications. The application programming interfaces may put messages to and get messages from the message queuing systems, and provide with each connect and put request application identification data.

19 Claims, 8 Drawing Sheets

PROCESSING MESSAGES IN A MESSAGE QUEUEING SYSTEM

FIELD OF THE INVENTION

The present invention relates to message queuing in an asynchronous messaging network, and in particular to a system, method, and computer program product for processing messages in a message queuing system, especially in message queuing clusters.

BACKGROUND

It is increasingly common to distribute a data processing operation over a plurality of data processing units, with each of the units communicating over a data communications network such as the Internet. One reason for this is that a particular data processing unit may be able to do a job better than another, so a first unit makes a request for a second unit to do a particular job and then to return the result to the first unit.

It is also common to have a large number of intermediate data processing units, which are also known as "nodes," between the originating unit that makes a request and the destination unit that is being requested to do the work. Each intermediate unit receives the request, performs some initial processing to determine what to do with it, and then forwards it on to the next unit.

One mechanism for carrying out such distributed data processing is called asynchronous message queuing, where applications communicate with each other by sending messages to a queue, which can then be accessed by the receiving application at a time that is convenient for the receiving application. IBM's WebSphere MQ (trademark) software product, which has been on the market for a number of years, is a popular example of this type of software.

Applications connect to a message queuing system and usually retrieve messages from one queue, perform their message processing with the retrieved message, and put the message on another queue in the message queuing system. From that queue, another application retrieves the message, performs its message processing, and puts it on another queue, and so on. To implement a message flow, however, each application needs to know the queue names for getting and putting the messages from or to queues. This becomes even more important in a grid where a service provider may provide services in a message queuing network.

SUMMARY

The present invention provides a system, method, and a computer program product for processing messages in a message queuing system by introducing an Application Repository, a Message Store, and a queue-less application programming interface (API) in each message queuing system.

Applications provide application identifying data like the application class, the provider name, the application name, and the version, using the connect function of the message queuing API to the Message Manager. The Message Manager stores the provided application identifying data of each application connected to the queuing system in the Application Repository, and removes them when the application disconnects from the queuing system. The application which puts messages to the queuing system provides data for identifying the target application (ApplIdentData) like application class, provider name, application name, and version, using the message PUT function of the message queuing API. The Message Manager stores each message received from the applications including ApplIdentData of the target application in the Message Store, and provides messages from the Message Store to the matching applications requesting messages from the queuing system. In a message queuing cluster, the member message queuing systems exchange their Application Repositories. If an application connects to one message queuing system in a message queuing cluster, the Message Managers of the other message queuing systems automatically forward messages dedicated for that application to that message queuing system until the application disconnects.

BRIEF DESCRIPTION OF THE DRAWINGS

The invention will be best understood by reading the following detailed description together with the drawings, wherein.

DETAILED DESCRIPTION

Figure 1:
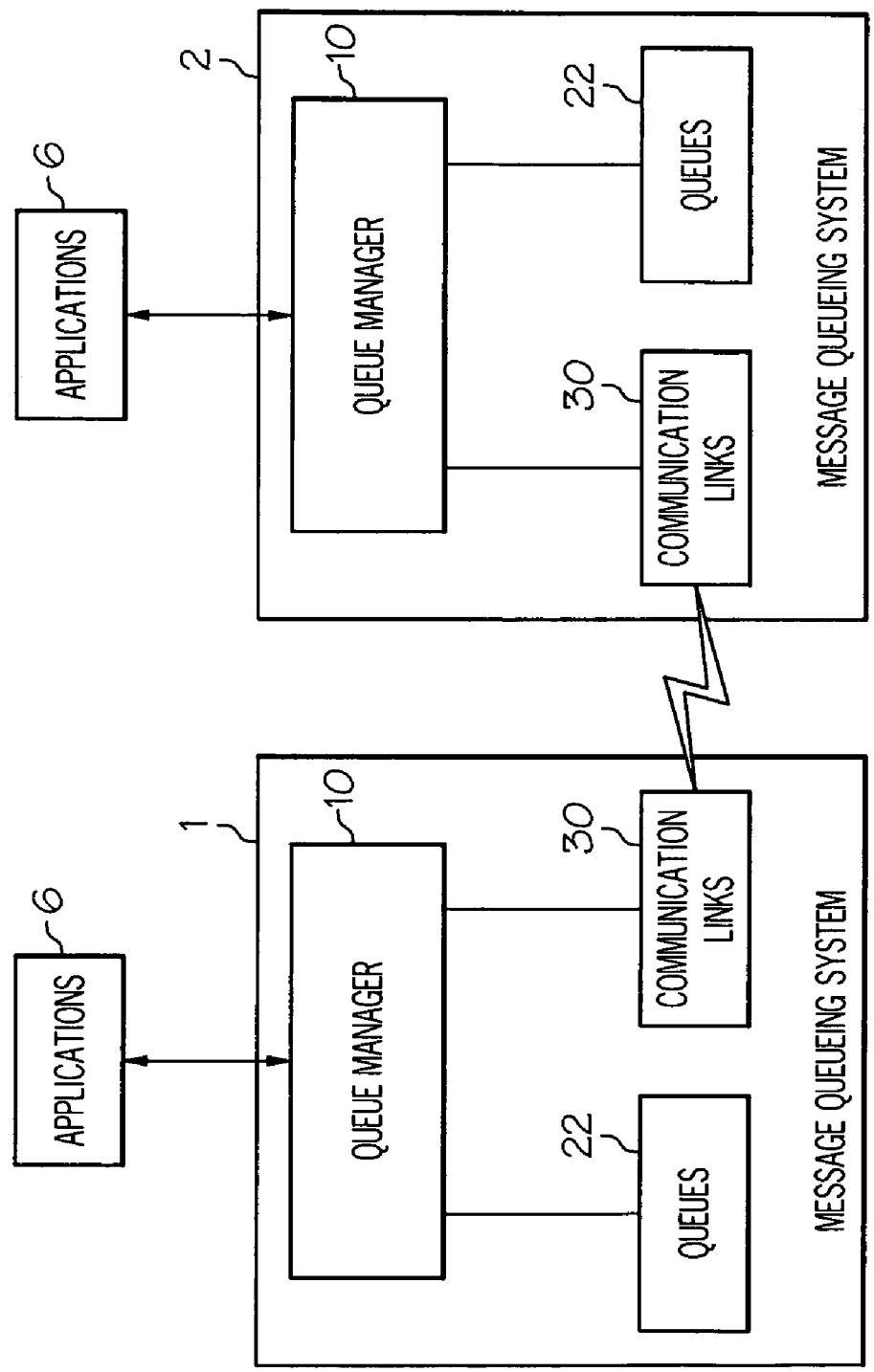
FIG. 1 shows a prior art message queuing system.

FIG. 1 shows a prior art message queuing system within a messaging network. Applications 6 generates messages and send them to message queuing systems 1, 2. The message queuing systems 1,2 each include at least a queue manager 10, queues 22, and communication links 30 to other message queuing systems. A queue 22 is a data structure used to store messages until they are retrieved by an application. Queues 22 are managed by the queue managers 10. Each queue manager 10 is responsible for maintaining the queues 22 it owns, and for storing all the messages it receives from application programs or other queue managers onto the appropriate queues, and retrieving the messages in response to application requests.

Queues 22 exist independently of the applications 6 that use them. A queue 22 can exist in main storage if it is temporary, on disk or similar auxiliary storage if it must be kept for recovery, or in both places if it is currently being used and must also be kept for recovery.

A message queuing system therefore is a system for asynchronous, assured exchange of information in the form of messages between applications connected to the system. The message descriptor of the message is known and interpretable by the message queuing system but not the message body whose layout is variable and application dependent. A message queuing system therefore stores and transports the messages regardless and without knowledge of the message content in the message body.

Multiple message queuing systems can be interconnected in a message queuing network which allows applications on different platforms and different physical locations to easily exchange data without knowledge of the underlying infrastructure. But a source application needs to know the queue name of the target application as well as the name of the queuing system to which the target application is connected. If the target application moves from the original message queuing system to another member message queuing system of a message queuing cluster, the messages on the queue of the origin message queuing system are lost for that application until they are manually transferred to the message queuing system the application has moved to.

Figure 2:
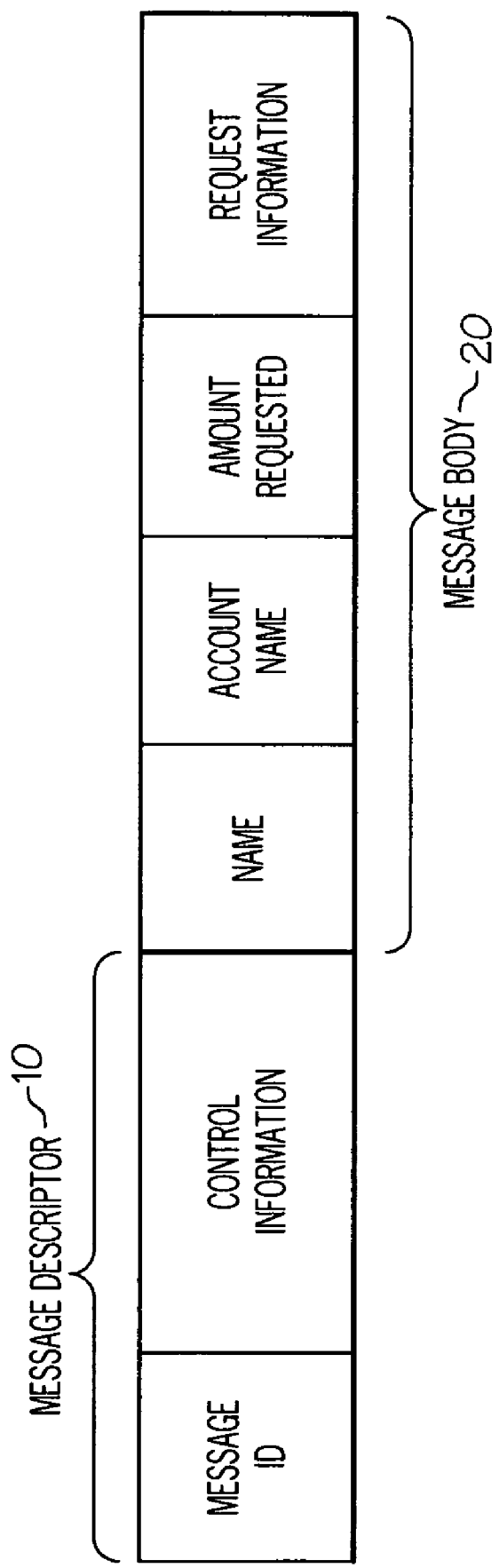
FIG. 2 shows the structure of a message used by the inventive message queuing system.

FIG. 2 shows the structure of a message as used by the present invention. Every such message has a message descriptor 10 and a message body 20.

The message descriptor 10 identifies the message using a message ID, and contains additional control information such as the type of the message and the priority assigned to the message by the sending application.

The message body 20 includes the application data. The content and structure of the application data are defined by the application program that use them.

Figure 3:
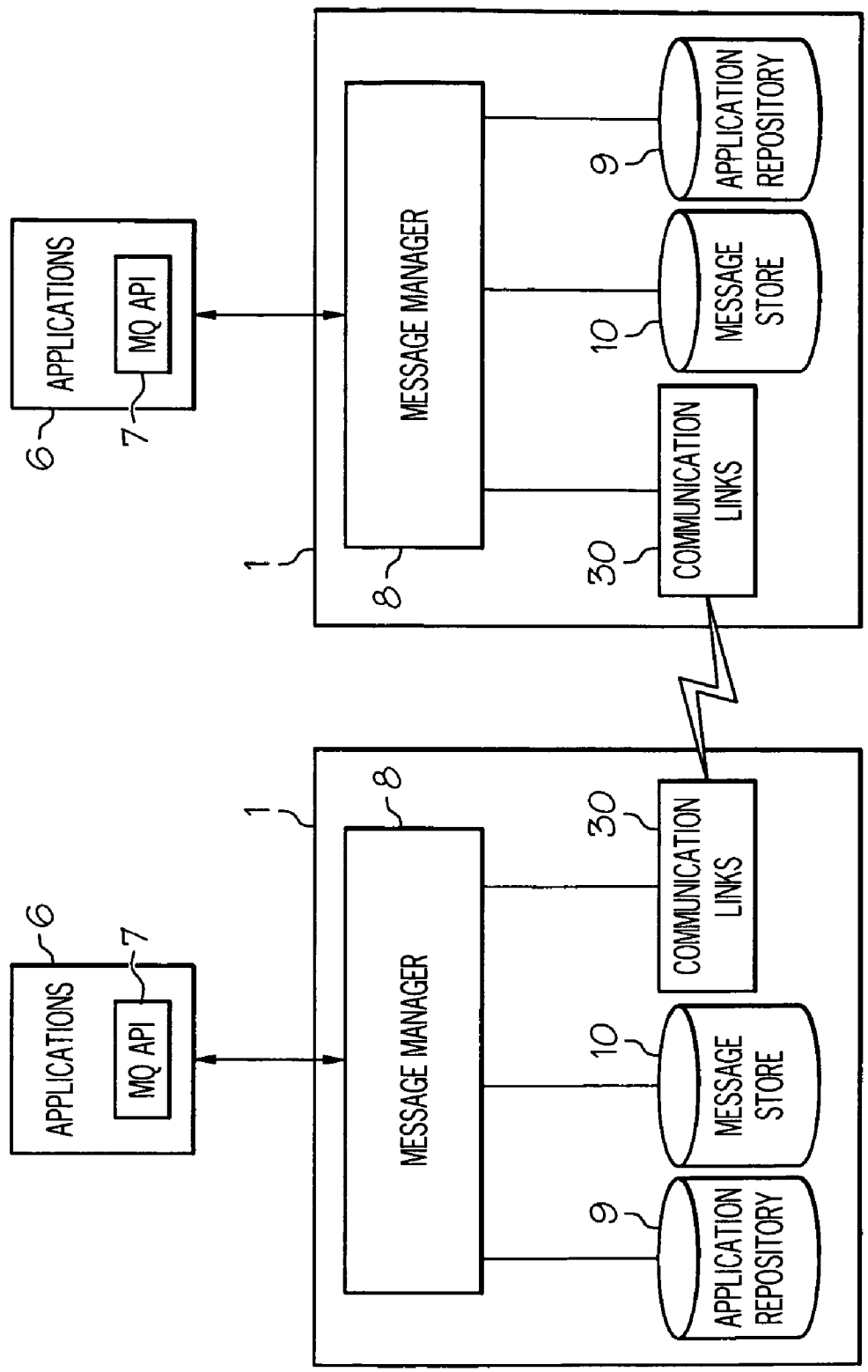
FIG. 3 shows the inventive message queuing system.

FIG. 3 shows the inventive message queuing system. The inventive message queuing system does not need a queue interface for asynchronously exchanging messages between applications. The message putting application specifies the target application on the "message put request" and the message queuing system automatically delivers the message to the respective target application. This is accomplished using a Message Store 10 for storing messages provided by a "message put request" by the applications 6, an Application Repository 9 for storing ApplIdentData of the connected applications 6, and a Message Manager 8—using a queuing API (Application Programming Interface; 7)—for processing requests (e.g., connect, put, get, and disconnect) generated by the applications 6.

The central component of the inventive message queuing system is the Message Manager 8. It provides the interface to the applications 6, executes requests of applications, and manages the inventive Message Store 10 and Application Repository 9 as well as the communication links 30. In a message queuing cluster, the Message Manager 8 additionally distributes the Application Repository 9 to the members of the message queuing cluster, and distributes the messages according to the application connection data in the Application Repository 9.

Each message queuing system may have its own Application Repository 9. The Application Repository 9 has an interface with the Message Manager 8. The Application Repository 9 is used for storing ApplIdentData of connected applications 6 including the message queuing system name the application 6 is connected to, and the performance index. The performance index is periodically calculated by the Message Manager 8, and is the quotient of the throughput rate of the application 6 and the current number of messages for that application 6 in the Message Store 10. The performance index is used for workload balancing in a message queuing cluster. The ApplIdentData is provided by the application 6 with the "connect request" and preferably includes five data elements:
an application class which defines the function of the application (e.g. message authentication, message validation, message auditing, customer verification),
provider name of the application (e.g. IBM, SWIFT, MQSoftware),
application identifier (e.g. 'VerifyMsg', 'com.ibm.MsgVerification', 'ICSQ002', etc.),
application version (e.g. '2.1.0', '5123'), and
Application Identifier Key (ApplIdentKey), which is computed during start-up of the application by the initialization function of the used message queuing API.

The ApplIdentData are permanently stored, as long as the application is connected, in the Application Repository 9, and are concurrently available with the existing session between application and Message Manager. In a preferred embodiment, the Application Repository 9 also includes accounting information for each application connected to the message queuing system.

Accounting information includes the user ID from the message descriptor of the processed messages, the number of messages processed as well as the total message size, and the time frame in which the messages have been counted. The Application Repository 9 is preferably implemented as data base.

Each message queuing system may have its own Message Store 10 as shown in FIG. 3. The Message Store 10 has an interface to the Message Manager 8. The Message Manager 8 stores the messages received by the connected applications 6 in the Message Store 8 and sends matching messages from the Message Store 10 to connected applications 6 requesting messages from the message queuing system 1. The messages stored in the Message Store 10 have assigned the ApplIdentData of the target application provided with the "message put request" of the connected application as well as the source ApplIdentData of the putting application provided with a session between putting application and Message Manger 8. The Message Store 10 is preferably implemented as data base (e.g. IBM DB2).

The message matching operation is performed on the target ApplIdentData stored with the message and the ApplIdentData of a connected application requesting a message from the queuing system on several levels:
if the ApplIdentKey is specified with the target ApplIdentData of the message, the message is only sent to the application with that ApplIdentKey
if the ApplIdentKey is not specified, a comparison of the ApplIdentData is performed on the remaining four data elements. The application class as well as the provider name must match exactly if specified. The application ID supports wildcards, and the application version supports compare operators. Data elements not specified are treated as wildcards.

The Message Manager 8 may operate on a first-in-first-out or on a message-priority basis.

In a further embodiment of the present invention, a target application list can be provided with the message which allows assigning a workflow to the message. The message is then sent to applications in the order specified in the target application list by the message queuing system.

The message queuing API is used as an interface between application 6 and Message Manager 8, and provides at least following functions:
establishing a connection or session between application 6 and Message Manager 8, thereby providing the ApplIdentData of the connected application 6,
disconnecting a connection or session between an application 6 and a Message Manager 8 and thereby deleting the ApplIdentData of the disconnecting application 6 from the Application Repository 9,
putting a message to the message queuing system 1, thereby providing the ApplIdentData of the target application 6 with the message, and
retrieving a message from the message queuing system 1.

Putting a message to the message queuing system 1 requires that the "message put request" include at least an application class or the ApplIdentKey of the target application. Optionally, the provider name, the Application ID, and the application version can be included. ApplIdentData of the receiving application 6 can be provided with the message descriptor for response report processing purposes.

When getting a message from the message queuing system, the "message get request" may include data elements of the ApplIdentData of the source application 6. The Message Manager 8 scans the Message Store 10 for messages having an assigned ApplIdentData that matches ApplIdentData of the requesting application 6, and provides the matching message to the requesting application 6.

In a further embodiment of the present invention, the Message Manager 8 provides the additional functionality for operating in a message queuing cluster. The additional functionality of the Message Manager 8 comprises the distribution of the content of the Application Repository 9 to the members message queuing systems of the message queuing cluster. This allows sending messages designated for an application connected to another member of the message queuing cluster directly to that message queuing system. The process flow within such a message queuing cluster is described in connection with FIG. 9.

Figure 9:
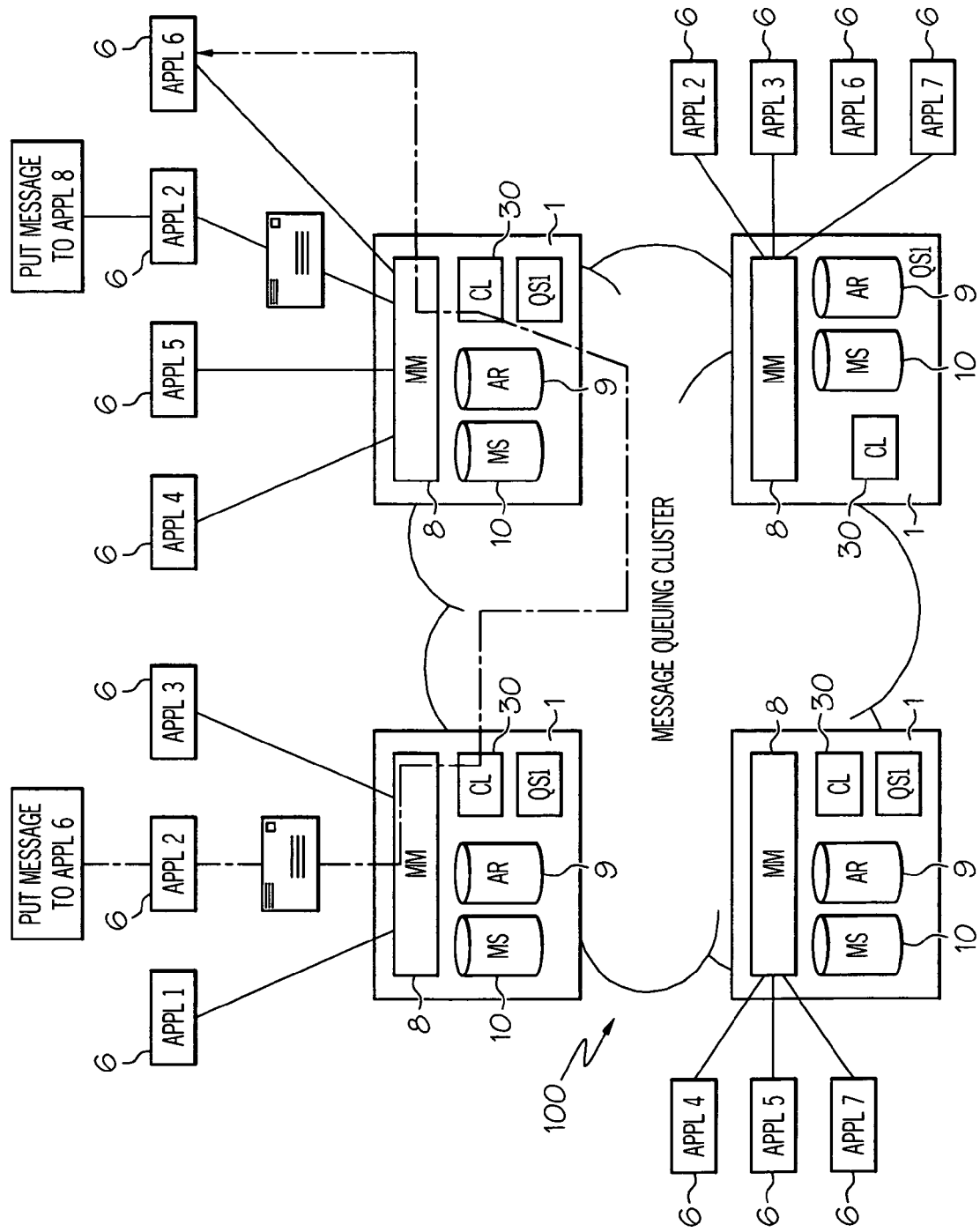
FIG. 9 shows a message queuing network using the present invention.

FIG. 9 shows a message queuing cluster 100 comprising four inventive message queuing systems as described in connection with FIG. 3, each having several applications 6 which are connected to the respective message queuing system. Each message queuing system in the cluster 100 includes a Message Manager 8, a Message Store 10, an Application Repository 9, and communication links 30 connecting the message queuing systems with each other. The content of each Application Repository 9 is distributed to each member of the cluster 100 and synchronized whenever an application 6 connects to or disconnects from a message queuing system 1 as described below. An application 6 puts a message to its connected queuing system 1 for another application 6 connected to any member of the message queuing cluster 100. The Message Manager 8 of the receiving message queuing system 1 scans its Application Repository 9 for an application 6 having the same ApplIdentData as specified with the message put request. If it finds an application 6 locally connected to the same message queuing system, it stores the message in its Message Store 10 until the target application 6 on the same message queuing system 1 requests that message. If it finds a matching application 6 connected to one of the members of that message queuing cluster 100, the Message Manager 8 sends the received message via the communication links 30 to that message queuing system. The Message Manager 8 of the receiving message queuing system 1 stores the received message in its Message Store 10 until the target application 6 requests that message.

If an application disconnects from a message queuing system and the same application connects to another member of the message queuing cluster 100, all messages for that application are automatically transferred by the Message Manager 8 to that message queuing system.

In another embodiment of the present invention, a performance index of every connected application 6 is computed and stored in the Application Repository 9. The synchronization of the Application Repository 9 in the message queuing cluster 100 is performed either if an application 6 connects or disconnects, or if a performance index deviates by more than a predefined threshold from its last stored and distributed value. If the same application 6 is connected more than one time in the message queuing cluster 100, a work load balancer component that is part of the Message Manager 8 receiving messages for that application 6 sends the messages to the message queuing system with the highest performance index connected with the application.

A preferred embodiment of the inventive message queuing system provides a monitoring component for monitoring applications, and in particular messages dedicated to specific applications. Thereby, conditions can be defined for raising an alert if messages for a specific application are not processed within a specified time.

Figure 4:
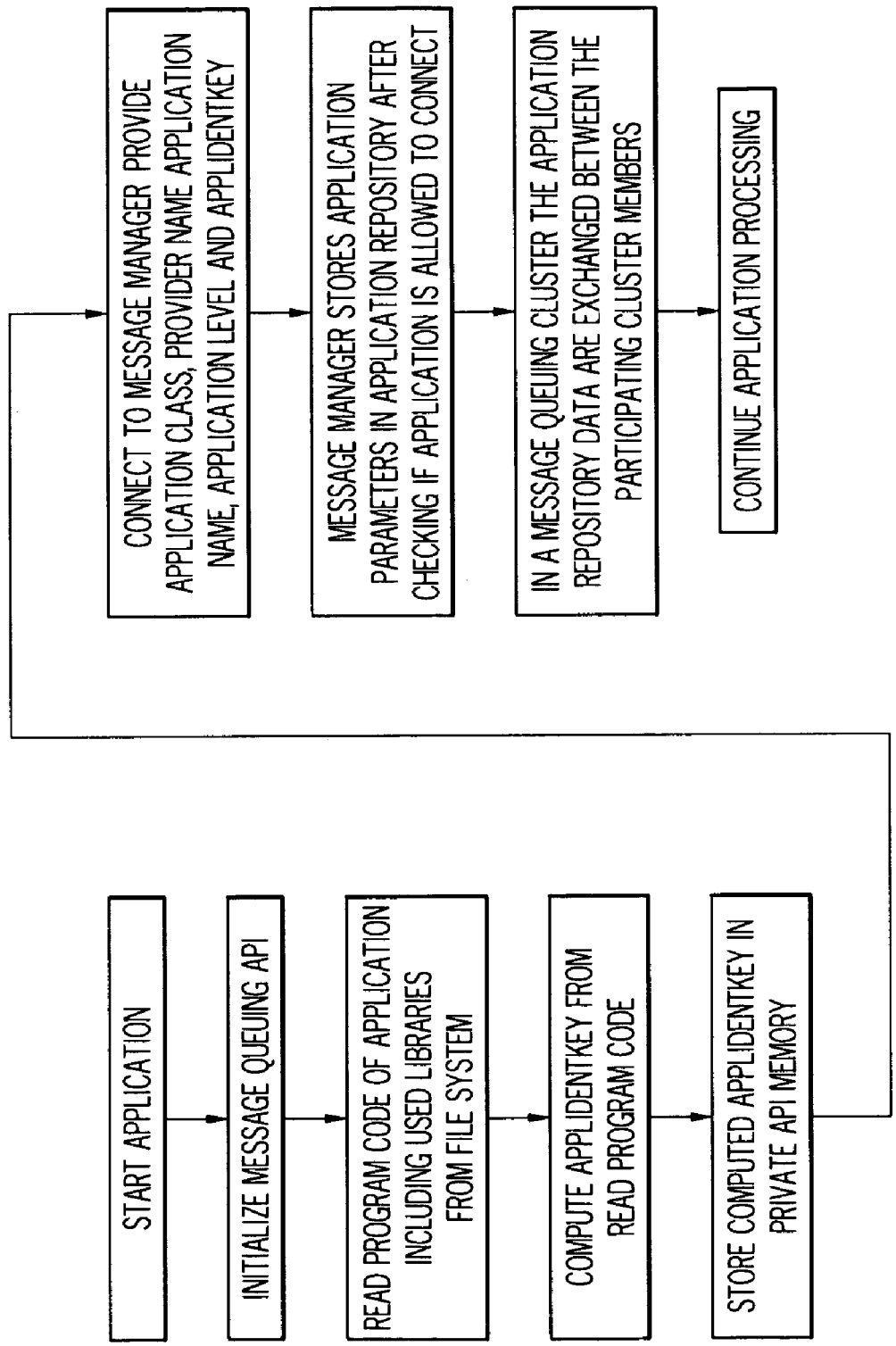
FIG. 4 shows the process flow for starting and connecting an application to the message queuing system according to the present invention.

FIG. 4 shows the process flow for starting and connecting an application to the message queuing system according to the present invention. When an application is started using the message queuing API, the ApplIdentKey is generated during the initialization of the respective message queuing API. It is computed from the application program code by applying a HASH function, and is stored in the private memory area of the message queuing API as long as the application is running. Then, the application sends a connect request to the Message Manager of the respective queuing system. Before a connection between Message Manager and an application is established, some security checks may be performed by the Message Manager. Such security checks are know in the prior art and do not need to be described in detail. After a successful security check, the Message Manager establishes a session with the application and stores the ApplIdentData provided with the "connect request" of the application in the Application Repository as well as in the local memory of the established session. If the message queuing system is member of a message queuing cluster, then the Message Manager sends an Application Repository update request to each member of the message queuing cluster for inserting the ApplIdentData of the connecting application in their Application Repositories.

Figure 5:
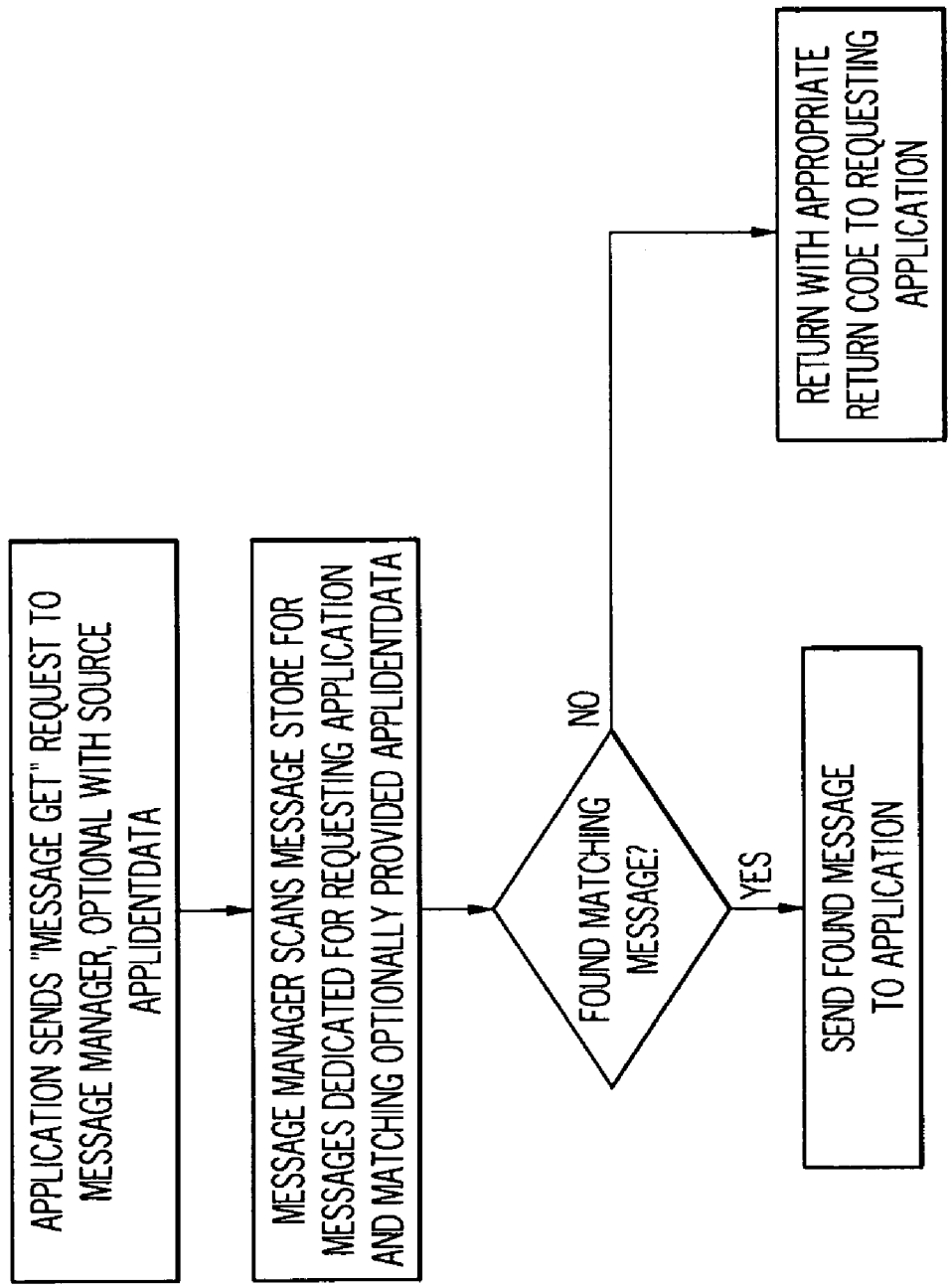
FIG. 5 shows the process flow for retrieving a message from the queuing system according to the present invention.

FIG. 5 shows the process flow for retrieving a message from the queuing system according to the present invention. The application sends a "message get request" to the connected Message Manager and may optionally provide ApplIdentData of the source application which has put the message to the message queuing system. The source ApplIdentData may be configurable data of the application. The Message Manager then scans its Message Store for messages, matching the assigned target ApplIdentData with the ApplIdentData of the requesting application. In the case that the requesting application also provides optionally the ApplIdentData of the source application, the assigned source ApplIdentData of the message must also match with that provided ApplIdentData. If the matching is successful, then the respective message is sent to the requesting application. If the matching is not successful, then it returns with an appropriate return code.

Figure 6:
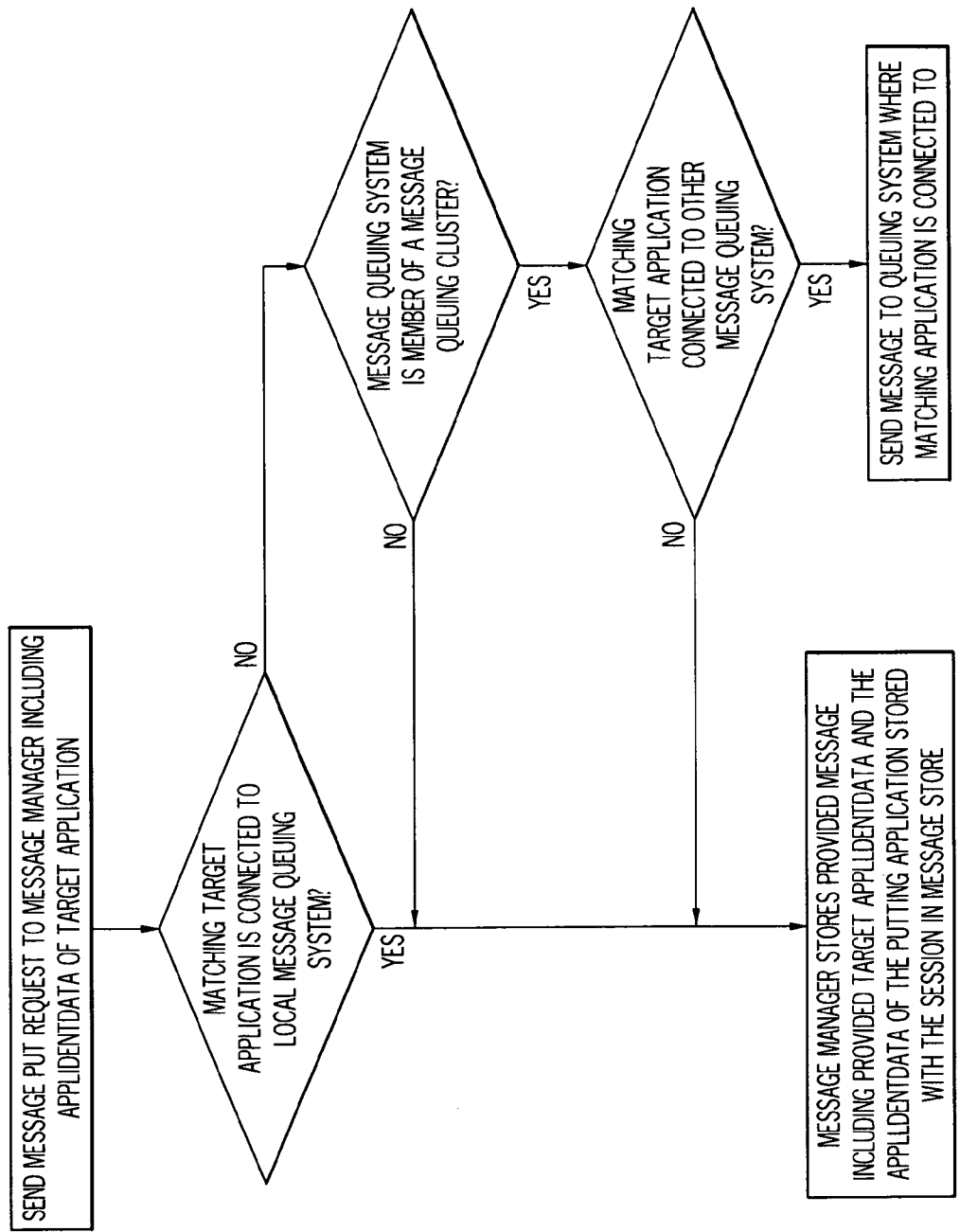
FIG. 6 shows the process flow for putting a message to the queuing system according to the present invention.

FIG. 6 shows the process flow for putting a message to the message queuing system according to the present invention.

If an application sends a "message put request" to the connected Message Manager including the ApplIdentData of the target application, the Message Manager checks whether the respective target application is already locally connected to it. If there is a local connection, the Message Manager stores the provided message including the provided ApplIdentData of the target application as well as the ApplIdentData of the requesting application provided with the established session in the Message Store. If there is no local connection, and the message queuing system is a member of a message queuing cluster, then the Message Manager checks in its Application Repository whether there is an application with the provided target ApplIdentData already connected to a member of that message queuing cluster. If so, the Message Manager sends the provided message including the provided ApplIdentData of the target application as well as the ApplIdentData of the putting application provided with the established session to that member message queuing system where the target application is connected to. If the message queuing system is not a member of a message queuing cluster, or the target application is not connected to a member of that message queuing cluster, the Message Manager stores the provided message including the provided AppIdentData of the target application as well as the ApplIdentData of the putting application provided with the established session in the Message Store.

Figure 7:
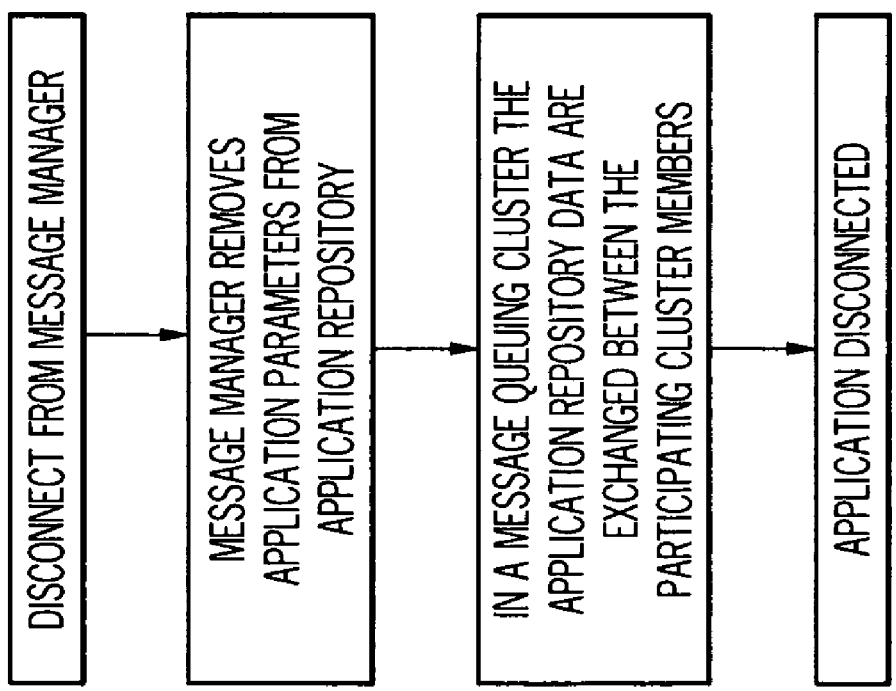
FIG. 7 shows the process flow for disconnecting an application from the queuing system according to the present invention.

FIG. 7 shows the process flow for disconnecting an application from the queuing system according to the present invention.

If the application sends a "disconnect request" to the Message Manager, the Message Manager removes the existing session with that application and deletes the ApplIdentData of that application from its Application Repository. If the message queuing system is member of a message queuing cluster, then the Message Manager sends an Application Repository update request to each member of the message queuing cluster for deleting the ApplIdentData of the disconnecting application from their application repositories.

Figure 8:
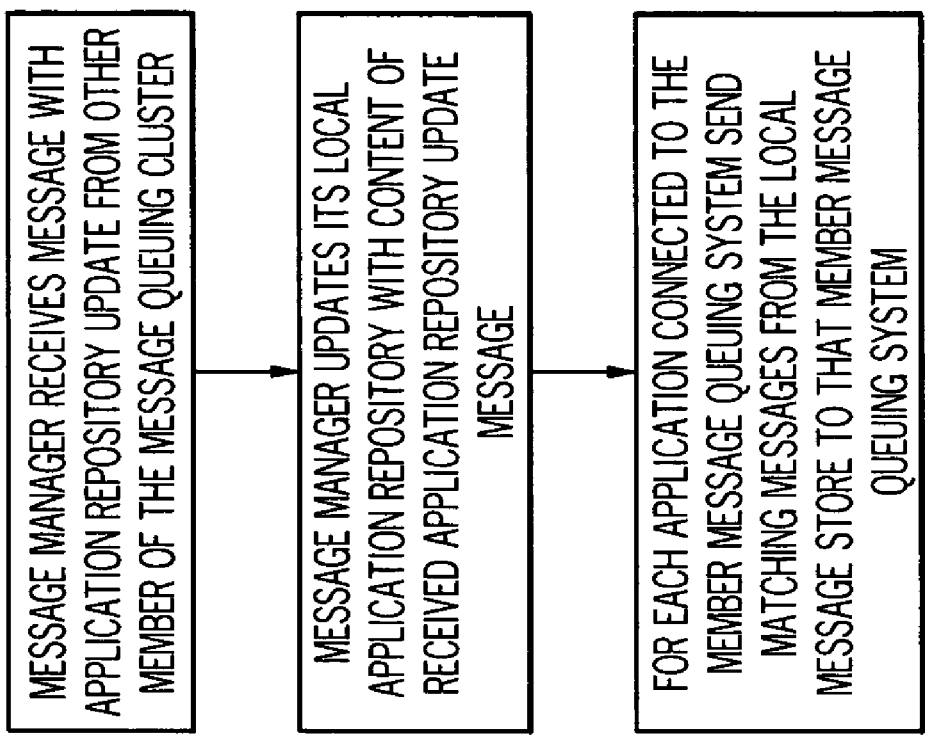
FIG. 8 shows the process flow for receiving and processing an Application Repository update message from another member message queuing system in the message queuing network using the present invention.

FIG. 8 shows the process flow for receiving and processing an Application Repository update message from another member message queuing system in the message queuing network using the present invention. If the Message Manager receives an Application Repository update request (new application has been connected) of another member of the message queuing cluster, the Message Manager updates its local Application Repository by inserting the ApplIdentData provided with the update request. Then it scans its Message Store for messages matching their assigned target ApplIdentData with the ApplIdentData of the newly connected application, and sends all matching messages to the message queuing system sending the update request.

What is claimed is:

1. A message queuing system, comprising:
a message manager for providing an interface to applications, for executing requests of said applications, and for providing an interface for managing a message store and an application repository;
a message store for storing messages from said applications;
an application repository for storing application identification data provided by said applications, wherein said application identification data includes at least one of: an application class which defines a function of the application and an application identification data key computed by said application; and
a message queuing application program interface for connecting applications to and disconnecting from said message manager of a message queuing system, for putting messages to and getting messages from said message queuing system, and providing with each connect and put request application identification data of said application to said message manager, wherein the message manager is configured to,
receive a connecting request from a connecting application including application identification data of the connecting application, wherein the application identification data is to include an application class defining a function of the connecting application, a provider name of the connecting application, an application identifier, an application version, an application identification data key;
establish a session with the connecting application and store said application identification data in the application repository, wherein the connecting application becomes a connected application;
receive a message from the connected application including application identification data of a target application, wherein the application identification data includes at least the application class of the connected application or the application identification data key of the connected application;
store the message including application identification data of the target application and application identification data of the connected application in the message store;
receive a message get request of an already connected requesting application;
scan the message store for messages with assigned application identification data of the target application matching with application identification data of the requesting application, wherein the scanning is either based on a first-in-first-out procedure or on a message priority procedure; and
send an identified message to said requesting application.

2. The message queuing system according to claim 1, further comprising communication links for communicating with other message queuing systems.

3. The message queuing system according to claim 2, wherein the other message queuing systems belonging to a message queuing cluster having members.

4. The message queuing system according to claim 3, wherein said message manager provides, for the message queuing cluster, an update of said application repository of said message queuing system to all members of the message queuing cluster, for receiving updates of application repositories of said members of said message queuing cluster, and processing said received updates.

5. The message queuing system according to claim 4, wherein said processing of said received updates includes updating said application repository, scanning the message store to identify messages dedicated to applications currently connected to said members of said message queuing cluster, and sending identified messages to said members of said message queuing cluster.

6. The message queuing system according to claim 5, wherein identifying messages is performed by comparing application identification data assigned to a message stored in said message store with said application identification data of connected applications stored in said application repository.

7. The message queuing system according to claim 3, further comprising a workload balancer being part of said message manager, wherein said message manager periodically computes a performance index for each connected application and stores said performance index with application identification data of an assigned application in said application repository, said workload balancer uses said performance index for comparing said performance indices of said applications and responsively selects a member of said message queuing cluster.

8. The message queuing system according to claim 1, wherein said message queuing application program interface is a part of said application.

9. The message queuing system according to claim 1, wherein said message queuing application program interface is separate from said application and is dynamically linked at run-time or statically linked at build time.

10. The message queuing system according to claim 1, wherein said application identification data key is computed during staff-up time of said application by using program code of said application from a file system as input and applying a HASH function to said input.

11. The message queuing system according to claim 10, wherein said application identification data key is stored in the private memory of said message queuing application program interface.

12. The message queuing system according to claim 1, wherein said message store and said application repository are implemented as a data base.

13. A method for processing messages in a message queuing system, comprising:
   receiving a connecting request from a connecting application including application identification data of the connecting application, wherein said application identification data includes an application class defining a function of said connecting application, a provider name of said application, an application identifier, an application version, an application identification data key;
   establishing a session with said connecting application and storing said application identification data in an application repository, wherein the connecting application becomes a connected application;
   receiving a message from said connected application including application identification data of a target application, wherein said application identification data includes at least the application class of said connected application or the application identification data key of said connected application;
   storing said message including application identification data of said target application and application identification data of said connected application in a message store;
   receiving a message get request of an already connected requesting application;
   scanning said message store for messages with assigned application identification data of said target application matching with application identification data of said requesting application, wherein said scanning is either based on a first-in-first-out procedure or on a message priority procedure; and
   sending an identified message to said requesting application.

14. The method according to claim 13, further comprising:
   detecting changes in content of said application repository; and
   providing said changes to all members of a message queuing cluster.

15. The method according to claim 14, further comprising:
   receiving changes of the content of the application repository of said members of said message queuing cluster; and
   updating said content of said application repository with said received changes.

16. The method according to claim 13, further comprising:
   receiving a message put request;
   evaluating a connection of the target application with a member of said message queuing cluster; and
   sending received message to said member of a message queuing cluster for the target application.

17. The method according to claim 13, further comprising:
   receiving changes of the content of the application repository of a member of a message queuing cluster;
   scanning said message store to identify messages with assigned application identification data of said target application matching with application identification data of received changes; and
   sending identified messages to said member.

18. The method according to claim 17, further comprising:
   receiving messages from a member of said message queuing cluster; and
   storing the received messages in said message store.

19. A computer program product for processing messages in a message queuing system, said computer program product comprising a computer readable medium having computer readable program code tangibly embedded therein, the computer readable program code comprising:
   computer readable program code configured to receive a connecting request from a connecting application including application identification data of the connecting application, wherein said application identification data includes an application class defining the function of said connecting application, a provider name of said application, an application identifier, an application version, an application identification data key;
   computer readable program code configured to establish a session with said connecting application and store said application identification data in an application repository, wherein the connecting application is to become a connected application;
   computer readable program code configured to receive a message from said connected application including application identification data of a target application, wherein said application identification data includes at least the application class of said connected application or the application identification data key of said connected application;
   computer readable program code configured to store said message including application identification data of said target application and application identification data of said connected application in a message store;
   computer readable program code configured to receive a message get request of an already connected requesting application;
   computer readable program code configured to scan said message store for messages with assigned application identification data of said target application matching with application identification data of said requesting application, wherein said scanning is either based on a first-in-first-out procedure or on a message priority procedure; and
   computer readable program code configured to send an identified message to said requesting application.

* * * * *